United States Patent
Christiansen

[15] 3,637,272
[45] Jan. 25, 1972

[54] BUSHING INSERT FOR ANTIFRICTION BEARING ASSEMBLIES

[72] Inventor: Michael G. Christiansen, 2524 Telegraph Road, St. Louis, Mo. 63125

[22] Filed: Apr. 9, 1970

[21] Appl. No.: 26,983

[52] U.S. Cl...............308/189, 308/35, 308/207, 308/237, 16/2
[51] Int. Cl. .................................................F16c 33/08
[58] Field of Search...........308/237, 189, 191, 36.1, 35, 308/207; 16/2, DIG. 27

[56] References Cited

UNITED STATES PATENTS 3,082,629    3/1963    Jones, Jr. et al. ..................308/189
1,414,290    4/1922    Larsh..................................308/189

Primary Examiner—Martin P. Schwadron
Assistant Examiner—Barry Grossman
Attorney—George J. Mager

[57] ABSTRACT

A flanged sleeve or bushing, fabricated of steel, adapted for insertion into a larger circular opening and a countersunk recess formed about and concentric with a somewhat smaller but deformed opening in the forward wall of an automotive transmission housing. Particularly adapted for use in the repair of transmission housings made of aluminum or cast iron. The bushing is fabricated of steel and designed for mounting therein the same antifriction bearing assembly that had been originally mounted in said smaller opening prior to its deformation.

1 Claims, 6 Drawing Figures

PATENTED JAN 25 1972 3,637,272
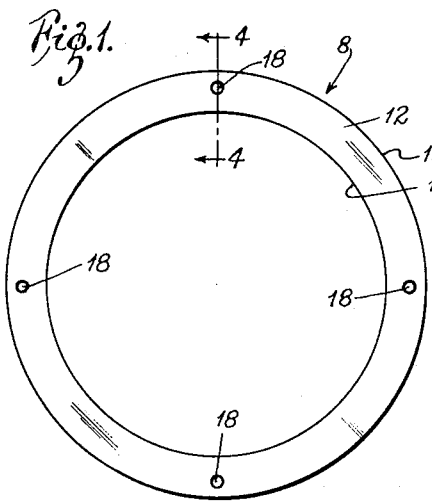
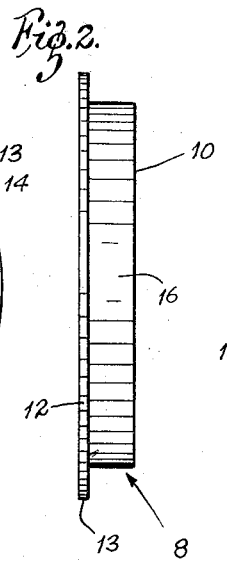
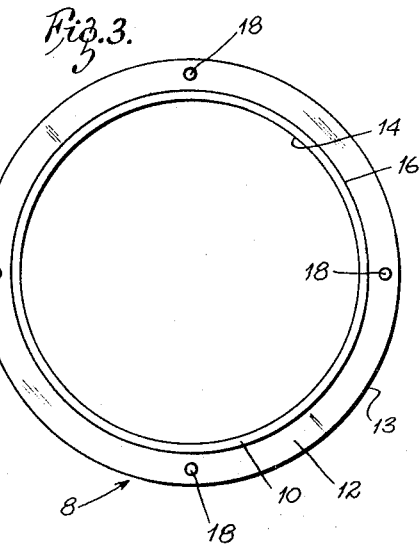
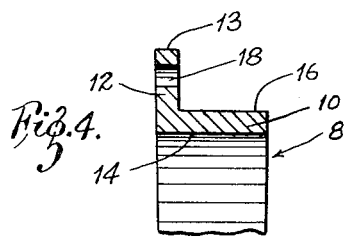
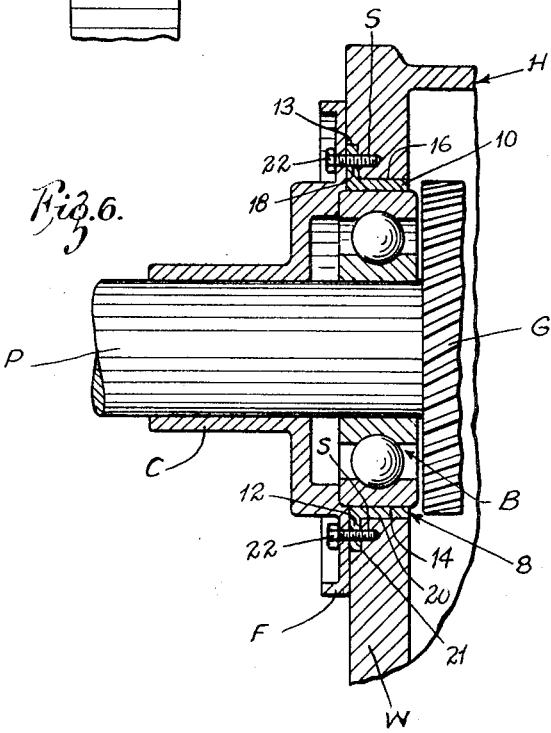
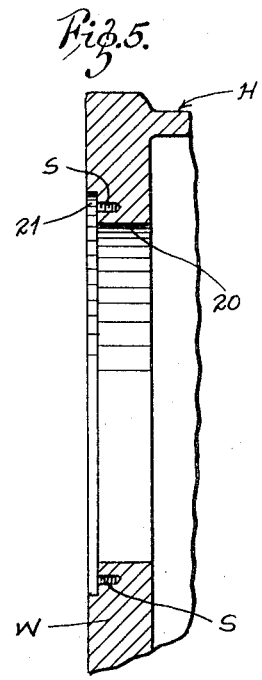
INVENTOR:
MICHAEL G. CHRISTIANSEN,
BY George J Mager
HIS ATTORNEY

BUSHING INSERT FOR ANTIFRICTION BEARING ASSEMBLIES

FIELD OF THE INVENTION

Primarily though not exclusively, the invention relates to automotive transmissions wherein the rear end portion of the input shaft is rotatably mounted in an antifriction bearing assembly, and terminates in a main drive gear located within the transmission housing.

In such transmissions, the aforesaid bearing assembly is initially mounted in a circular opening provided therefor in the front wall of the housing.ABgradually, and particularly when the input shaft is caused to rotate continuously at high speeds, (for example in automobile racing), the torque load on the bearing assembly tends to effect deformation of the said opening, until eventually, the said assembly increasingly wobbles, thus causing malfunctioning of the transmission mechanism driven by the main drive gear.

Currently, when the bearing assembly supporting opening reaches the stage of deformation described, the entire transmission housing must be discarded. In accordance with the concepts of the present invention, this would not be necessary, as will appear.

SUMMARY OF THE INVENTION

The bushing insert of this invention is fabricated of steel to include integrally: a cylindrical hollow main body portion and a circular flange portion that extends radially outwardly therefrom. The internal diameter of the main body portion would correspond with the external diameter of the bearing assembly; the external diameter of the main body portion would correspond to the internal diameter of the opening to be provided in the front wall of the housing; and the peripheral edge of the flange portion would correspond with the diameter of the annular countersunk recess to be formed in said front wall of the housing concentric with the opening aforesaid. For most installations, the flange portion would have a circularly spaced series of round holes formed therein, the spacing of said holes corresponding to that of the internally threaded sockets existent in the housing front wall.

The invention is illustrated on a sheet of drawings that accompanies this specification. Objects and advantages not specifically noted hereinbefore will be apparent or pointed out in the detailed description that will follow with reference to said drawings.

BRIEF DESCRIPTION OF THE DRAWINGS

FIG. 1 is a front elevational view of a bushing insert embodying the present invention;

FIG. 2 is a right side elevational view thereof;

FIG. 3 is a rear elevational view of the bushing;

FIG. 4 is an enlarged fragmentary sectional view taken on line 4—4 of FIG. 1;

FIG. 5 is a fragmentary vertical sectional view of an exemplary automotive transmission housing with its forward wall conditioned in accordance with the teachings of the present invention; and FIG. 6 is a fragmentary vertical sectional view exemplarily illustrating the invention in use.

DESCRIPTION OF THE PREFERRED EMBODIMENT

The bushing insert of the present invention is generally indicated 8. It includes a hollow cylindrical main body portion 10, and an integral therewith flange portion 12 that extends radially outwardly therefrom, and has a circular peripheral edge 13 concentric with said main body portion. The annular internal surface 14 of the main body portion 12 would be diametered so as to snugly receive the outer periphery of the bearing assembly for which it is intended, and the annular outer surface 16 would be so diametered as to snugly engage the circular opening that would be provided therefor, as will appear. Formed in the flange 12 is a circularly spaced series of round holes 18 each adapted for passage therethrough of the threaded shank portion of a headed bolt.

With attention now directed to FIGS. 5 and 6, the primary utilization of the invention is there illustrated. In these views, one end portion of an exemplary aluminum automotive transmission casing or housing H is shown to include a front wall W. A circular opening 20 and a larger concentric countersunk recess 21 having been formed in said wall in accordance with the teachings of this invention, the bushing 8 is shown inserted thereinto and secured in place by means of bolts 22. The shanks of these bolts extend through the existent openings formed in the flange F of a conventional shaft-supporting cap member C, and the holes 18 provided in the flange 12, thence into engagement with the existent internally threaded sockets S in the wall W.

It will be observed that the thickness of the flange 12 and the peripheral edge 13 thereof are determined by the depth and diameter of the recess 21.

The exemplary antifriction bearing assembly B illustrated is of a conventional ball bearing type, and includes inner and outer raceways with a series of circularly spaced spherical elements interposed therebetween in usual fashion. It will be understood however, that the invention is likewise applicable to antifriction assemblies of the roller bearing type.

The bearing assembly B disposed within the surrounding inner surface 14 of the bushing 8, rotatably supports that portion of the power input shaft P adjacently to the main drive gear G of the transmission in conventional fashion.

USE

Although it is believed that the manner of utilizing the invention should be apparent, a brief further explanation will be given.

Thus, it will be understood that in its original status, the front wall W of the housing H will have been provided with a circular opening diametered to snugly embrace the bearing assembly B. Each time that the input shaft P rotates at high speed, the torque is so to speak loaded onto the bearing B. Consequently, the region of the front wall W about the original circular opening becomes increasingly heated, particularly when the high-speed driving is maintained for a considerable length of time. This will cause a slight softening of the material surrounding the aforesaid opening particularly when the transmission casing is made of aluminum or cast iron as is understood. Consequently, the bearing assembly B will begin to wobble and thus distort the inner circular surface of said opening. Eventually, as the bearing assembly continues to wobble and increasingly deform the opening, the shaft P together with the main drive gear G will wobble in unison therewith. The resultant malfunctioning of the transmission mechanism is deemed to be obvious.

In order to remedy such situation, a circular opening 20, having a diameter corresponding to that of the annular outer surface 16 of the bushing 8 main body 10, and a concentric countersunk recess 21 having a diameter corresponding to that of the peripheral edge 13 of the flange portion 12 and a depth corresponding to the axial thickness of said flange, would be formed in the wall W by conventional line-boring operations, whereby said opening 20 would be concentric with that in the rear wall of the housing H through which the output shaft of the transmission (not illustrated) extends. Thereupon the bushing 8 would be inserted and secured as illustrated and described, thus effectively conditioning the housing H and the therein transmission mechanism for further use.

The bushing insert may obviously be modified somewhat without departing from the principles of the invention. Wherefore the invention is not to be limited to the precise structural details illustrated and described.

I claim:

1. In combination:

An automotive transmission housing having a front wall with internally threaded sockets, an intake shaft extending from said housing, an antifriction bearing assembly for rotatably supporting said shaft, a shaft-supporting cap member, said cap member having a flange with holes therethrough, said holes mating with said sockets in said front wall, means wherewith to mount said antifriction bearing assembly in a circular opening in said front wall of said housing, said means comprising a bushing fabricated of steel and further including:

a hollow cylindrical main body portion having an internal diameter in correspondence with the external diameter of said bearing assembly, and an external diameter in correspondence with the internal diameter of said circular opening of said front wall, a radially outwardly extending flange portion integral and concentric with said main body portion, having a peripheral edge diameter in correspondence with the diameter of a countersunk recess provided therefore in said front wall, said recess being concentric with said circular opening in said front wall, the thickness of said flange portion being in correspondence with the depth of said countersunk recess, a plurality of circularly spaced holes in said bushing flange, the spacing of said holes being in correspondence with the spacing of said holes in said flange of said cap member, whereby, said bushing and said cap member may be secured in place by bolt means extending through said holes in said bushing flange portion, said cap member flange portion, and said sockets in said front wall.

* * * * *